United States Patent [19]

Halldorsson et al.

[11] Patent Number: 4,825,063

[45] Date of Patent: Apr. 25, 1989

[54] RADIATION POSITION DETECTION USING TIME-INDICATIVE VARIABLE-LENGTH FIBER ARRAY

[75] Inventors: Thorsteinn Halldorsson, Munich; Ernst-August Seiffarth, Taufkirchen; Sigmund Manhart, Haar, all of Fed. Rep. of Germany

[73] Assignee: Messerschmitt-Bökow-Blohm GmbH, Munich, Fed. Rep. of Germany

[21] Appl. No.: 165,639

[22] Filed: Mar. 8, 1988

[30] Foreign Application Priority Data

Mar. 26, 1987 [DE] Fed. Rep. of Germany ..... 87104470

[51] Int. Cl.$^4$ .............................................. G01J 1/20
[52] U.S. Cl. .................... 250/203 R; 250/227; 356/152
[58] Field of Search ............. 250/203 R, 227; 356/141, 152

[56] References Cited

U.S. PATENT DOCUMENTS 3,953,131 4/1976 Britz .................................. 250/227
4,380,391 4/1983 Buser et al. ....................... 250/227
4,674,874 6/1987 Halldorsson et al. ........ 250/203 R Primary Examiner—David C. Nelms
Assistant Examiner—Eric Chatmon
Attorney, Agent, or Firm—Kenyon & Kenyon

[57] ABSTRACT

A detector device for detecting and indicating the origin of laser radiation is disclosed. The detector has a plurality of discrete optics, with the discrete optics being arranged in azimuth planes. Each discrete optics monitors a preset solid angle with significant overlap between the angles. Each discrete optics has a first and second wave guide. The first wave guides are coupled to a first opto-electric transducer and the second wave guide is coupled to a second opto-electric transducer. The transducers are respectively coupled to a first and a second detector stage. All first wave guides leading to the first detector stage are of equal length while the second wave guides are of incrementally increasing length in the direction of increasing azimuth angle. The incrementally increasing length causes increasing travel time for light pulses over the wave guides. A transit time measuring device is coupled to the first and second detector stage and determines the beginning and end of the transit time measurement and, as a function of its, the solid angle of the incident laser radiation. Additionally, the opto-electric transducers of the first and second detector stages are coupled with a resonant circuit which acts as a filter stage. The resonant period of the resonant circuit is at least four times larger than the duration of the build-up time of the arriving laser pulse. The damped resonant circuits of the first and second detector stages are respectively coupled to passage-through-the-zero-axis detectors. The first time the incoming signal triggers one of the zero-axis detectors a starting signal is sent to the transit time measuring circuit and the next time one of the zero-axis detectors is triggered a stopping signal is sent to the measuring circuit.

12 Claims, 4 Drawing Sheets

RADIATION POSITION DETECTION USING TIME-INDICATIVE VARIABLE-LENGTH FIBER ARRAY

BACKGROUND OF THE INVENTION

Laser radiation of visible and/or infrared wavelengths is used for a variety of purposes in modern armed forces. For example, pulsed or intensity modulated laser radiation is used in fire control systems to designate the target, in missiles to guide the missile to a chosen target, in aircraft for providing control signals to the control surfaces, and in many other systems.

The use of lasers to designate targets is the particular concern of this invention. It is clearly in the interest of the operator of a target so designated, be it a vehicle, ship, or aircraft, to be alerted to the presence of laser radiation and the direction from whence it comes. This detection and localization of the threat must occur at the target and must detect the threat amidst a pattern of disturbing background radiation. The wave length, pulse length and pulse repetition frequency should also be determined to learn the nature of the threat. A knowledge of all these factors will enable the target to react properly, by engaging the laser source, maneuvering to avoid the beam, using smoke or other types of false target generators to mask itself, etc.

Different targets such as ships, vehicles, helicopters, airplanes and satellites make different demands on a detector system in both the width of the solid angle to be scanned and the angle resolution required in the azimuth and elevation directions. For example, for vehicles in the field such as tanks and trucks, the threat, typically other tanks or low-flying helicopters, comes from a source in elevation angular ranges near the horizontal plane. The required detection range is thus 360° in the azimuth plane and an elevation plane angle of ±30°. By elevation plane the applicant intends all planes perpendicular to the horizontal or azimuth plane.

The nature of vehicular travel is such that large changes in azimuth usually occur slowly while elevation changes can occur much more rapidly over the same tim period. However, these elevation changes are usually of a small order, typically a few feet. Therefore the detection system must provide precise azimuth angle measurements of a laser radiation source with respect to the system of coordinates of the vehicle. Elevation angle measurement is of much less importance. The full sensitivity of the radiation detection over the entire demanded elevation range must be insured, however, in order to locate the radiation source precisely.

With other targets, particularly helicopters, airplanes, and satellites, their high mobility requires precise angular resolution in both the azimuth and elevation direction. The solid angle ranges should be 360° in the azimuth plane and +90° in the elevation plane.

In addition to the different requirements for the angular detection ranges of the sensors, the user also needs to be able to detect radiation from lasers of widely different pulse rates, wavelength and frequency.

The great number of different military radiation sources range from short-wave visible light up to thermal infrared. The wavelength ranges for frequency displaced Excimer lasers are 0.4 $\mu$m, for laser diodes 0.85 to 0.95 $\mu$m, for alexandrite lasers 0.75 to 0.85 $\mu$m, for Nd:YAG 1.06 $\mu$m to 1.32 $\mu$m, for Nd:YAG-Methane Raman Shifted 1.52 $\mu$m, for Erbium 1.65 $\mu$m, for Holmium 2.12 $\mu$m, for Deuterium Flouride 3.6 $\mu$m to 4.0 $\mu$m, and for $CO_2$ lasers 9.5 $\mu$m to 11.5 $\mu$m. The radiation detector must have a broad band spectral sensitivity to receive and detect all these different laser sources. Additionally, filters cannot be used to reduce interference from background lighting as such filters also reduce the spectral sensitivity of opto-electronic detectors.

The laser detector must be able to operate faultlessly despite the mobility of the target objects. If sunlight impinges directly upon the detector the rate of false alarms should still remain reasonably low. Additionally the laser detector must be insensitive to other artificial lighting sources such as stroboscopes, flashlamps, canon fire, flares, or any other type of light flash.

The detector device must furthermore have a large dynamic signal range so that operation is not impaired by different weather conditions, varying distances between the warning sensor and the laser source, changing pulse energies of the laser, changing incident locations of the laser beam with the target, and the turbulent fluctuations of the atmosphere over the radiation cross section. Disturbances of the angle measurements through secondary reflections of the laser radiation in the environment and at the target must also be prevented.

Laser radiation detector devices are known from DEP No. 33 23 828 as well as DE-OS No. 35 25 518. These devices contain at least a first and second detector stage, each stage having an opto-electric transducer with associated discrete optics, the stages acting together to detect laser radiation over a preset solid angle. A certain amount of overlap occurs between each of these preset solid angles to insure complete coverage. The discrete optics are arranged in azimuth planes with a first and second wave guide for each of the discrete optics. The wave guides lead respectively to the first and second detector stages with all wave guides that lead to the first stages having the same length. The wave guides that lead to the second detector stage are of different lengths, their length being graded incrementally in the direction of increasing azimuth angle. The incremental increase in length causes an incremental increase in transit times. A transit time measuring device is coupled to each respective first and second detector stage to determine the beginning and end of the transit time and, as a function of it, to determine the azimuth angle of the incident laser radiation.

The previously described devices use a pair of fiber optic wave guides behind a common discrete optics. Depending on the magnitude of the solid angle to be scanned, numerous such sets of discrete optics are necessary. Adjacent discrete optics have overlapping discrete solid angle ranges. All first wave guides for the discrete optics are led to a first detector, which upon arrival of a laser impulse triggers a transit time measuring circuit. All second wave guides, which are of different lengths, are connected with a second detector, which, when activated stops the transit time measuring circuit. The time difference between the starting and the stopping of the counter circuit, which is a function of the length of the second wave guide, is a measure of which solid angle in the azimuth plane the laser radiation is coming from. As there is some overlap between each of the pairs of detector stages and their respective solid angle detection zones, all around detection is ensured.

Although ideally the laser radiation would impinge on the optics of one set of discrete optics only, in actuality the radiation also impinges on the adjacent sets of discrete optics. The consequence of this is that the transit time measuring circuits of the adjacent detector stages provide a timing signal, one of them preceding the main detector pulse and one of them succeeding the main pulse. In order to determine the precise azimuth solid angle of the incident radiation, an interpolation operation is carried out to determine the temporal center of these three received pulses. The calculations necessary to do so are described in DE-OS No. 35 25 518.

SUMMARY OF THE INVENTION

It is an object of this invention to create a laser radiation detector which will be capable of precise solid angle determination of laser radiation based upon transit time measurements, without requiring a temporal circuit and center determining circuit.

It is an additional object of this invention to minimize the effects of interference signals.

These objects and others are achieved by coupling the opto-electric transducer of the first and second detector stage to a damped resonant circuit. The duration of the build-up phase of resonant oscillation (until maximum amplitude is reached) is greater than or equal to the typical build-up time of a laser pulse arriving on at least one of the discrete optics. Each of the damped resonant circuits of the first and second detector stage is coupled to a respective passage-through-the-zero-axis detector stage. Upon the first crossing of the zero axis by the particular damped oscillation a starting signal is sent to the transit time measuring circuit. The next crossing of the zero axis generates the stopping signal for the measuring circuit.

In this manner a simple radiation detector device is created which yields a definite time reference point for the transit time measurement for both the arriving laser pulse as well as the time-delayed laser pulse for the azimuth angle determination. Even if the laser radiation impinges on two or three adjacent discrete optics and wave guides, an exact azimuth angle determination is obtained through a time center formation by the damped oscillations of the resonant circuit. Due to the fact that the resonance period respective to the resonance frequency has been chosen appropriately, in particular a resonance period four times greater than the duration or build-up of the arriving laser pulse has been selected, the phase position of the harmonic total signal is strictly correlated with the temporal center of the laser pulse signal. If, for example, two pulses with a distance between each other smaller than $\frac{1}{4}$ of the duration of the harmonic damped oscillation arrive on the detector simultaneously, superpositioning occurs automatically and the resultant harmonic oscillation is correlated to a common center. This means that by measuring the first and second (or succeeding) zero-axis-passage of the damped harmonic oscillation, a definite time reference for measuring the transit time difference between the undelayed and the delayed laser pulse is created. Interpolation between two adjacent pulses takes place automatically.

A further advantage of the invention can be seen in that the detector functions independently of the pulse amplitude, as operation occurs in the linear range of the opto-electrical transducer (photodiode). No distortion of phase occurs through possible non-linear amplification of the signals. A very broad dynamic range of signals can thus be detected, roughly >120 dB.

The damped resonant circuit with defined resonance frequency function like a selective filter with defined bandwidth. Signals in the resonant frequency range are passed with slight damping while signals outside the bandwidth are attenuated very sharply.

In particular, military lasers generally have a pulse width of 10-200 nanoseconds or use long pulses with pulse length ranging from microseconds to seconds. When the pulse length is long, however, the build-up time to maximum amplitude is generally very short, on the order of 50 to 200 nanoseconds.

Compared to other fast light processes with build-up times greater than a few microseconds, laser pulses have oscillation frequency components of markedly higher frequency. This means that a selective oscillation filter tuned to the fixed middle fundamental frequency of the laser, including the adjacent frequency fraction lying within the bandwidth, will effectively separate other light processes from the laser light.

Laser pulse components of width T cause a resonant effect on the damped oscillation circuit, if the circuit's resonant frequency is inversely proportional to eight times the value of the laser pulse width. Using T as the width of the laser pulse, an optimum oscillation frequency is obtained in the range of a few MHZ.

A further refinement of the invention is the inclusion of an error signal circuit. The circuit has a time window stage and generates a blocking signal for the transit time measuring circuit or the evaluation circuit when the time between the starting and stopping signal is greater than the maximum transit time difference between the longest second wave guide and the first wave guide. The advantage to this circuit is that time measurement is initiated and evaluated only if the starting and stopping signal is in the time window. Additionally, a threshold value circuit with a variable threshold trigger may be coupled to the resonant filter. The threshold can be changed by monitoring an interference signal which is comprised of noise and background lighting. Thus the rate of false alarms is reduced. As the value of the threshold can be continuously readjusted, the sensitivity of the device in weak sunlight can be made greater than the sensitivity of the device in strong sunlight. The probability of detecting weak laser pulses at the opto-electrical transducer is consequently increased along with the sensitivity in the visible and infrared range.

The two zero-axis detector circuits are coupled to a digital logic circuit. The transit time measuring circuit is preferably a counter circuit clocked by an oscillator.

The addition of a third wave guide to each discrete optics allows the detector to determine the precise angle of the laser radiation source in the elevation direction. The third wave guide lies in the elevation plane perpendicular to the azimuth plane and is coupled to a third detector stage which is likewise coupled to a damped resonant circuit. All third wave guides are the same length. The sensitivity of the azimuth angle direction is independent of the determined elevation direction of the laser radiation.

Hence, in an advantageous manner, simultaneous angle resolution of the same or equal size is obtained in the azimuth direction as well as in the elevation direction. This is of critical importance in detecting flying targets. A wave guide bundle series in the elevation direction is created identical to a wave guide bundle series in the azimuth direction. Each of the two bundle series has a separate detector stage assigned to it to generate a stop signal. A common detector is provided for creating the start signal for the transit time measuring circuit which measures the transit time difference in the direction of elevation as well as in the direction of the azimuth.

BRIEF DESCRIPTION OF THE DRAWINGS

The invention will now be explained in greater detail with the aid of an embodiment in conjunction with the drawings in which.

DETAILED DESCRIPTION

Figure 1:
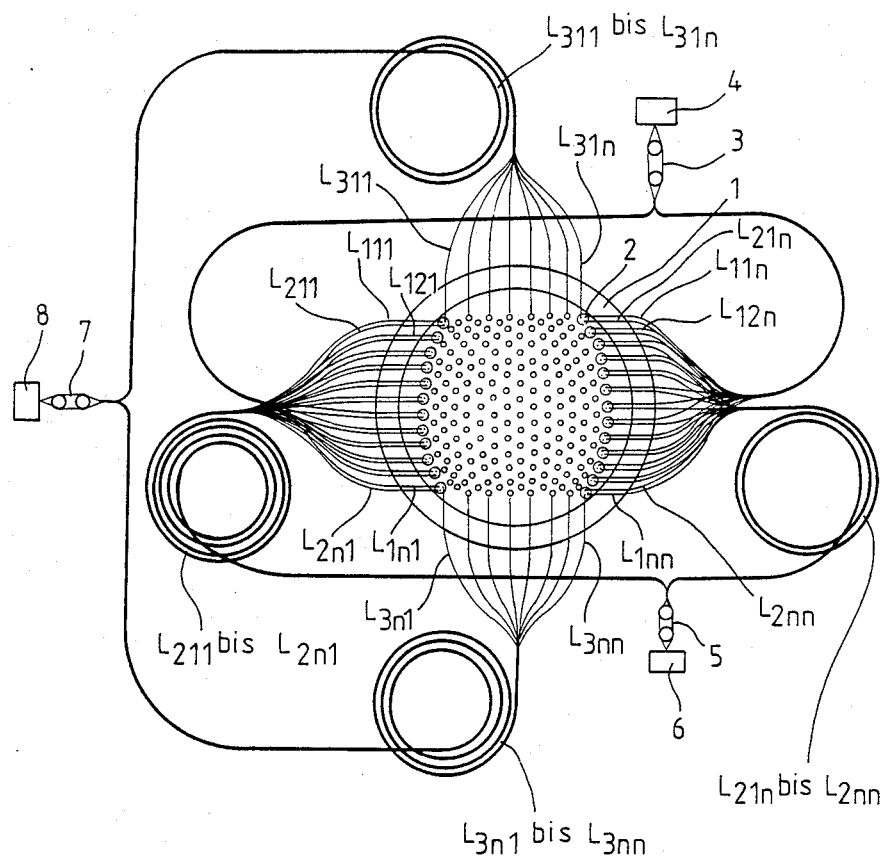
FIG. 1 is a schematic representation of the detector device with discrete optics with wave guides arranged in the azimuth and elevation planes.

Referring to FIG. 1, the laser radiation detector has a sensor head 1. The head is a sphere which contains a plurality of apertures in both the azimuth and elevation direction. The discrete optics form particular azimuth and elevation planes for subsequent evaluation Coupled to each discrete optic are three fiber optic wave guides. One end of each particular wave guide is in the focal plane of each discrete optics 2. The first wave guide of the first discrete optics of the topmost (viewing the sphere from the side, the topmost is the highest point on the sphere) azimuth plane is labeled $L_{1,1,1}$. Of the three subscripted numbers, the first indicates which number of the three wave guides that the wave guide is, the second indicates which azimuth plane the element is in, and the third indicates which discrete optics in a given azimuth plane the fiber is connected to. The first wave guide displaced 180° on the first azimuth plane is labelled $L_{1,1,n}$. The first wave guide of the first discrete optics of the azimuth plane below that is $L_{1,2,1}$. The first wave guide of the first discrete optics of the lowermost azimuth plane is labeled $L_{1, n, n}$.

All of the first wave guides $L_{1, 1, 1}$ to $L_{1, n, n}$ are of identical length and are led in a bundle to optics 3, which images the front-face ends of the wave guides onto a detector device 4. This detector device is also called the starting stage.

The second wave guide of the first discrete optics of the uppermost azimuth plane is called $L_{2, 1, 1}$ while the second wave guide displaced by 180° is called $L_{2, 1, n}$. The second wave guide of the first discrete optics o the lowermost azimuth plane is labeled $L_{2, n, 1}$ while the second wave guide displaced by 180° carries the reference $L_{2, n, n}$. The second wave guides $L_{2, 1, 1}$ to $L_{2, n, 1}$ form a common elevation plane and are bundled into a wave guide bundle ]nd lead to a second receiving optics 5, which images the front-face ends of these new wave guide on a second detector stage The wave guides from $L_{2, 1, 1}$ to $L_{2, n, 1}$ are of identical length and are perpendicular to the azimuth planes.

The individual second wave guide of the discrete optics, which are displaced by 180° compared to the previously mentioned first discrete optics, and lie n common successive elevation planes, are referred to as $L_{2, 1, n}$ to $L_{2, n, n}$ are guided as a bundle to receiver optics 5. Although they are equal in length to each other, they are longer than those guides which comprised the first elevation plane. The length of the individual second wave guides which form elevation planes intermediate to the $L_{2, 1, n}$ to $L_{2, n, n}$ plane increase in length respective to the length of the previous elevation plane.

This construction means that, depending upon the particular azimuth angle in each of the azimuth planes, equal sensitivity to and resolution of the incoming laser pulse is possible. Detector stage 6 is also called the first stopping stage. The graded differences in length between he wave guides of adjacent elevation planes are of equal magnitude. This means that the measured difference of lengths relative to the first wave guide is a measure of the azimuth angle under which an arriving laser pulse impinges on the half-spherical head of the detector device.

The third wave guide of the first discrete optics of the uppermost azimuth plane is referred to as $L_{3, 1, 1}$ while the third wave guide of the same azimuth plane displaced by 180° is called $L_{3, 1, n}$. All wave guides $L_{3, 1, 1}$ to $L_{3, 1, n}$ are combined into a bundle and led to receiving optics 7, which images the front-face of the bundle on detector stage 8, which is also referred to a second stopping stage. Wave guides $L_{3, 1, 1}$ to $L_{3, 1, n}$ are of identical length.

The third wave guide of the first discrete optics of the lowermost azimuth plane is labeled $L_{3, n, 1}$. The wave guide of the same plane displaced 180° is referenced as $L_{3, n, n}$. These elements, $L_{3, n, 1}$ to $L_{3, n, n}$ are gathered in bundles and led to receiving optics 7, which images the front face of the fiber optic bundle on third detector stage 8. Wave guides $L_{3, n, 1}$ to $L_{3, n, n}$ are all he same length. However, these third wave guides are of a different length than those in the uppermost azimuth plane. In one embodiment the equator plane of the spherical head is considered the original azimuth plane and the third wave guides in this plane have a first length with length gradations occurring in each azimuth plane above and below the equatorial axis.

Figure 2:
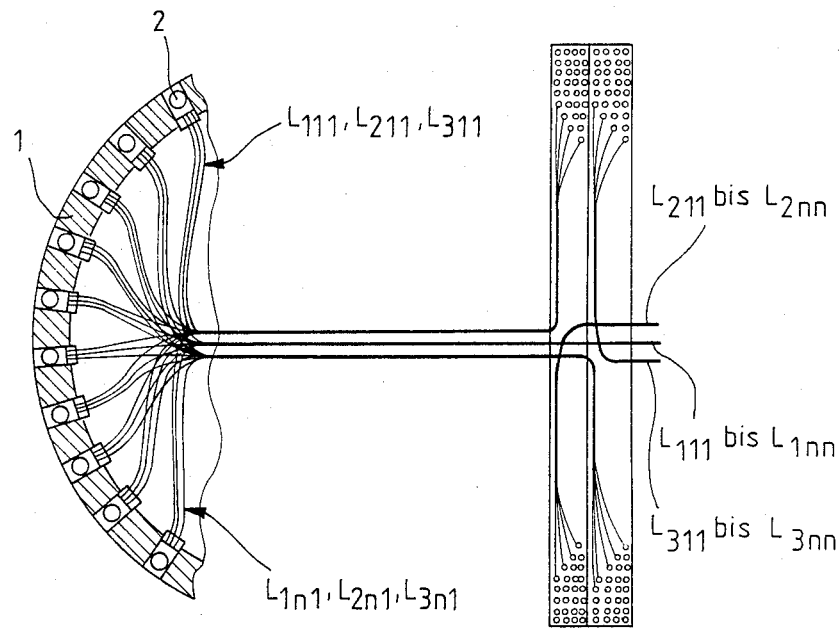
FIG. 2. is a cross section taken through the sensor head of the detector device.

FIG. 2 shows a cross-section of the spherical sensor head 1 through the vertical axis, partially sectioned. All parts which correspond to parts shown in FIG. 1 are labelled with the same numbers.

Figure 3A:
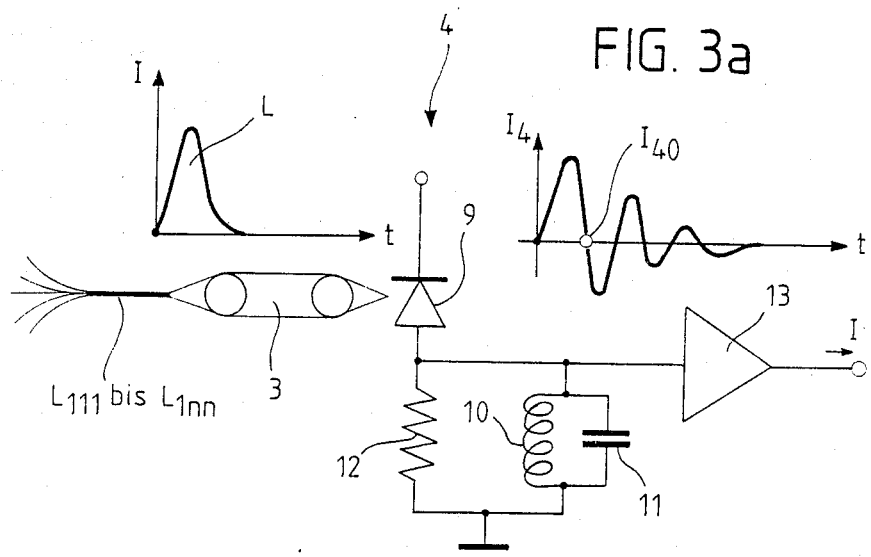
FIG. 3a and 3b are laser signal processing wave forms with the associated detector electronics.

As seen in FIG. 3A, first wave guides $L_{1, 1, 1}$ to $L_{1, n, n}$ are guided to imaging optics 3 which images the front-face ends of these wave guides on a photodiode 9 which diode is part of the first detector stage 4. The photodiode is coupled in series with a damped resonant circuit comprised of a resistor 12, coil 10, and capacitor 11. Additionally diode 9 and filter circuit 10, 11 and 12 are coupled to an amplifier 13 at the output of which amplifier current I flows. If a laser pulse impinges on the detector sphere a laser pulse L is transmitted over wave guide bundle L, $_{1, 1}$ to $L_{1, n, n}$. This pulse has the current response over time as shown in FIG. 3A and labelled L. For discussion purposes he width of this laser pulse is taken as 50 nanoseconds. The period duration of the damped resonant circuit is chosen so hat it is four times longer than the laser pulse's duration. In this example the filter will have a period of about 200 nanoseconds. This means that the resonance frequency of the damped resonant circuit will be about 5 MHz. The damped oscillation response of the current of the damped resonant circuit is also shown in FIG. 3A and labelled DR. In a subsequent stage, which stage is not shown in FIG. 3A, the first passage through zero $I_{40}$ of the damped oscillation is determined and used as a starting signal for the counter circuit shown in FIG. 4 and discussed later in this description.

Figure 3B:
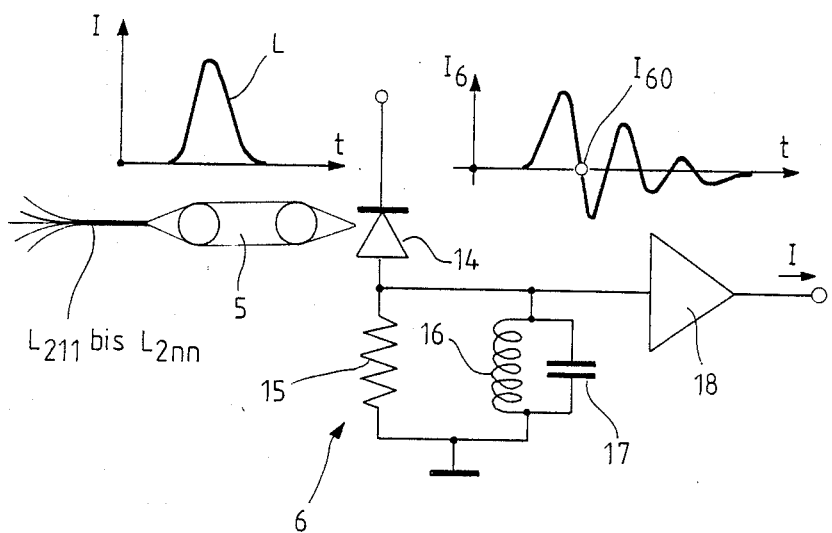

In FIG. 3B the second wave guide bundle $L_{2, 1, 1}$ to $L_{2, n, n}$ is shown which is guided to imaging optics 5 which images the front-face ends of these waveguides on photodiode 14, which diode is part of detector stage 6. Photodiode 14 is coupled to a damped resonant circuit comprised of resistor 15, coil 16 and capacitor 17. This circuit has the same resonant frequency as that described for the circuit connected to wave guides $L_{1, 1, 1}$ to $L_{1, n, n}$. An amplifier 18 is coupled to the damped resonant circuit. As can be seen in FIG. 3B the longer length of wave guides $L_{2, 1, 1}$ to $L_{2, n, n}$ delays the arrival of the laser pulse on receiver optics 5 and consequently on photodiode 14. The damped oscillation is consequently correspondingly delayed. The first crossing of the zero axis by this damped oscillation is indicated as $I_{60}$. This first zero passage in detector stage 6 is delayed compared to the first zero passage of the non-delayed damped oscillation in detector stage 4. The difference between the two first zero passages is the delay time. This provides the measure of the azimuth angle of the incident laser beam.

Figure 4:
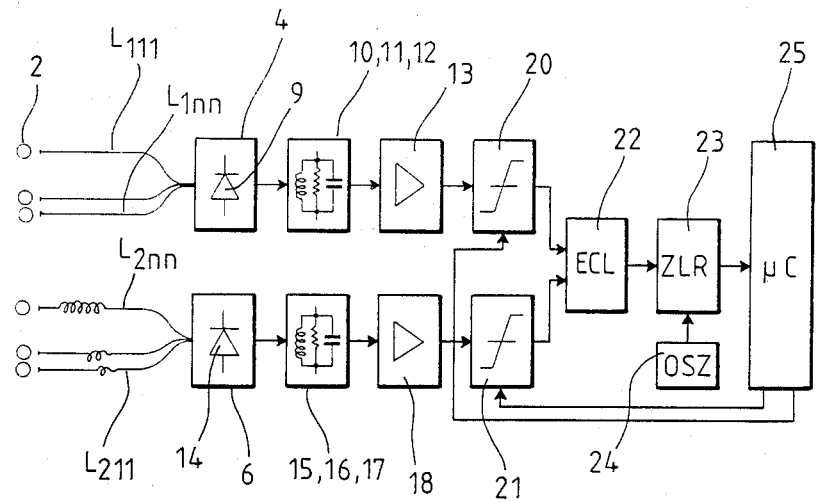
FIG. 4 is a schematic representation of the signal processing and evaluation circuitry.

Referring now to FIG. 4, the starting channel for the timing circuit is formed by the first wave guides $L_{1, 1, 1}$ to $L_{1, n, n}$ coupled with the first detector stage 4 comprised of photodiode 9, coupled to the damped resonant circuit 1, 11, 12, amplifier 18, and downstream threshold stage 20 with variable level response.

The second channel or first stopping channel is formed by the second wave guides $L_{2, 1, 1}$ to $L_{2, n, n}$, the second detector stage comprised of photodiode 14 coupled to the damped resonant circuit 15, 16, 17, amplifier 18 and a threshold stage 21 with variable response level. The outputs of the two threshold value stages 20 and 21 are coupled to emitter-coupled logic circuit 22 which converts the received analog signals to digital ones. Circuit 22 also determines when the zero axis has been passed through. Counter circuit 23 is coupled to logic circuit 22. Counter 23 is clocked by oscillator 24. The counter circuit 23 is coupled at its output side to a microcomputer 25, which has control outputs leading to the control inputs of threshold circuits 20 and 21 The threshold value is automatically reset by microcomputer 25 as a function of the background lighting in order to avoid interference signals as much as possible.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. A detector device for detecting the presence and originating location of laser radiation comprising
a plurality of discrete optics, each discrete optic being capable of detecting laser radiation over a certain solid angle, the solid angle of each discrete optics overlapping the solid angle of its neighbors, and the discrete optics being arranged in azimuth planes;
first and second wave guide coupled to each discrete optics, with all first wave guides being of identical length and the lengths of the second wave guides being of increasing length in the direction of increasing azimuth angle in order to form different transit times;
first and second detector stages having optoelectrical transducers and coupled respectively to the first and second wave guides; and
transit time measuring circuit coupled to the first and second detector stage which determines the total time between detection by the first detector stage and the second detector stage and consequently the azimuth angle of the incident laser radiation;
wherein the opto-electrical transducers of the first and second detector stage are coupled to respective damped resonant circuits, the resonant circuits requiring greater or equal amounts of time to reach maximum amplitude than the respective time to reach maximum amplitude of one laser pulse on at least one of the discrete optics and the damped resonant circuits being coupled to passage-through-the-zero-axis detectors, the detectors providing start and stop signals to the transit time measuring circuit.

2. The detector device of claim 1, further comprising an evaluating circuit coupled to said first and second detector stages, the evaluating circuit having a time window circuit which monitors the signals from the first and second detector stages and an error signal circuit coupled to the time window circuit, the error signal circuit generating an error signal if the time between the start and stop signals is greater than the calculated maximum transit time difference between a first wave guide and the longest second wave guide, the evaluating circuit being capable of triggering a switching process if the number of detected error signals exceeds a preset number.

3. The detector device of claim 1 wherein the damped resonant circuits have a resonance period of between four and eight times the value of the longer of the laser pulse duration or the time to reach maximum amplitude of the laser pulse.

4. The detector device of claim 3, wherein a first and second threshold value circuit with variable trigger threshold is coupled to the first and second passage-through-the-zero-axis detectors, the variable trigger threshold being adjusted by an interference signal circuit coupled to the threshold value circuits, the interference signal circuit being capable of determining the interference signal peaks and adjusting the variable trigger thresholds.

5. The detector device of claim 4 wherein the output from the threshold value circuits are coupled to a digital logic circuit.

6. The detector device of claim 5 wherein the transit time measuring circuit is comprised of a counter circuit clocked by an oscillator.

7. The detector device of claim 6 wherein the counter circuit is coupled to a microcomputer, the microcomputer being coupled to the first and second threshold value circuits and capable of adjusting the threshold value.

8. The detector device of claim 1 wherein a third wave guide is coupled to each discrete optics, the third wave guides coupled to discrete optics in the same elevation plane being of increasing length in the increasing elevation angle direction, each of the third wave guides being coupled to a third detector stage, said third detector stage having a damped resonant circuit.

9. The detector device of claim 8, wherein all third wave guides on the same azimuth plane are of equal length.

10. The detector device of claim 9 wherein all second wave guide on the same elevation plane are of equal length.

11. The detector device of claim 10 wherein the transit times of the second and third wave guides are processed in separate channels and use separate identifiers.

12. The detector device of claim 3 wherein the resonance frequency of the damped resonant circuit is between 1 and 5 megahertz and the damped resonant circuit has a bandwidth of 10 to 200 nanoseconds.

* * * * *